(12) United States Patent
Bendo

(10) Patent No.: US 7,657,962 B2
(45) Date of Patent: Feb. 9, 2010

(54) WIPER MOTOR

(75) Inventor: Keiichi Bendo, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 859 days.

(21) Appl. No.: 11/231,180

(22) Filed: Sep. 20, 2005

(65) Prior Publication Data

US 2006/0059646 A1  Mar. 23, 2006

(30) Foreign Application Priority Data

Sep. 21, 2004  (JP) ............................. 2004-274113

(51) Int. Cl.
*B60S 1/24* (2006.01)
*B60S 1/26* (2006.01)
*B60S 1/16* (2006.01)

(52) U.S. Cl. ................................. 15/250.3; 15/250.31

(58) Field of Classification Search ................ 15/250.3, 15/250.16, 250.31; 74/42, 26
See application file for complete search history.

(56) References Cited

U.S. PATENT DOCUMENTS

| | | | |
|---|---|---|---|
| 4,774,423 A | 9/1988 | Karasawa et al. | |
| 5,203,219 A | 4/1993 | Blanchet | 74/42 |
| 5,566,577 A | 10/1996 | Klar | |
| 5,622,077 A | 4/1997 | Blanchet et al. | 74/42 |
| 5,655,405 A | 8/1997 | Lerouge et al. | 74/42 |
| 5,848,553 A * | 12/1998 | Miyazaki | 74/42 |
| 5,855,140 A * | 1/1999 | Imamura | 74/42 |
| 5,907,885 A * | 6/1999 | Tilli et al. | 15/250.16 |
| 5,990,586 A | 11/1999 | Milano, Jr. | |
| 6,205,612 B1 * | 3/2001 | Tilli et al. | 15/250.16 |
| 6,449,798 B1 * | 9/2002 | Rivin et al. | 15/250.3 |
| 2005/0097698 A1 | 5/2005 | Yagi et al. | |
| 2005/0097699 A1 | 5/2005 | Yagi et al. | |
| 2006/0059646 A1 * | 3/2006 | Bendo | 15/250.3 |

(Continued)

FOREIGN PATENT DOCUMENTS

DE    32 47 421 A    7/1984

(Continued)

OTHER PUBLICATIONS

European Search Report for Serial No. EP 05 29 1931 dated Aug. 29, 2007.

(Continued)

*Primary Examiner*—Lee D Wilson
(74) *Attorney, Agent, or Firm*—McCormick, Paulding & Huber LLP

(57) ABSTRACT

An assembling operation of a wiper motor is facilitated. An output shaft and a gear shaft of the sector gear part are connected by a swinging plate. A first slidable contact member is mounted on a tip of the output shaft, and a second slidable contact part is mounted on a tip of the gear shaft. Since these slidably contact with a cover, axial-directional movement of the respective shafts is restricted. In addition, a provisional holding part having a leg part extending in an axial direction and a claw part protruding from the leg part is formed integrally with the second slidable contact part, and the sector gear part and the swinging part are sandwiched between the claw part and the second slidable contact part, whereby the motive power conversion member and the swinging plate are provisionally held.

12 Claims, 4 Drawing Sheets

U.S. PATENT DOCUMENTS

2006/0060457 A1　3/2006　Bendo

FOREIGN PATENT DOCUMENTS

| DE | 39 14823 A1 | 11/1990 |
|---|---|---|
| JP | 04-292244 | 10/1992 |
| JP | 06-316252 | 11/1994 |
| JP | 09-224350 | 8/1997 |
| JP | 2000-289574 | 10/2000 |
| JP | 2000-310309 | 11/2000 |
| JP | 2000-341906 | 12/2000 |
| JP | 2001-063528 | 3/2001 |
| JP | 2004-114886 | 4/2004 |

OTHER PUBLICATIONS

European Search Report for Serial No. EP 05 29 1932 dated Aug. 28, 2007.

* cited by examiner

WIPER MOTOR

CROSS-REFERENCED TO RELATED APPLICATION

An applicant hereby claims foreign priority benefits under U.S.C. §119 from Japanese Patent Application No. 2004-274113, filed on Sep. 21, 2004, the content of which is incorporated by reference herein.

BACKGROUND OF THE INVENTION

The present invention relates to a wiper motor, which has an electric motor and an output shaft for outputting motive power generated by the electric motor and swings a wiper arm attached to the output shaft.

In a rear wiper device or the like for wiping a rear window glass of a vehicle, a wiper motor having a motive power conversion mechanism for converting rotary motion of the electric motor into swinging motion of the output shaft is used to directly fix the wiper arm to the output shaft.

Such a wiper motor has a gear case comprising a case body formed into a bathtub-like shape and a cover for closing the case body, wherein a worm wheel of a worm gear mechanism for reducing the rotation of the electric motor and an output gear fixed to the output shaft are rotatably housed in the case body. A linking shaft is provided at the worm wheel away from a rotation-central axis, and an arm part serving as a motive power conversion member is rotatably connected to the linking shaft. In addition, a sector gear part meshing with the output gear is provided in the motive power conversion member, and a gear shaft which is press-fitted in an axial center of the sector gear part is rotatably supported by a swinging plate swingably supported by the output shaft. For this reason, when the electric motor operates and the worm wheel rotates, the arm part reciprocates and the sector gear part swings around the output gear, whereby the rotary motion of the worm wheel is converted into the swinging motion of the output shaft by the motive power conversion member.

In such a wiper motor, when an external force due to, for example, mischief is applied to the wiper arm or while the electric motor is operated, a load in a direction of separating these gears is generated between the output gear and the sector gear part. Then, due to the load, the gear shaft is inclined with respect to the output shaft so that the swinging plate serves as a supporting point, whereby there is such fear that mesh of the respective gears may be misaligned. Therefore, for example in the wiper motor disclosed in Japanese Patent Laid-Open Publication No. 09-224305, a resin-made slidable contact member is mounted on tip portions of the output shaft and the gear shaft and the slidable contact member slidably contacts with the cover, so that axial-directional movement of the respective shafts is restricted and looseness of the respective gears is suppressed.

SUMMARY OF THE INVENTION

However, in the conventional wiper motor, there is a need of assembling the worm wheel, the swinging plate, the motive power conversion member, the output gear fixed to the output shaft, and the slidable contact member in this order in a state of separating from one another. Therefore, there has been a problem of complicating an assembling operation thereof.

An object of the present invention is to facilitate the assembling operation of the wiper motor.

A wiper motor according to the present invention, which has an electric motor and an output shaft for outputting motive power generated by said electric motor and swings and drives a wiper arm attached to said output shaft, comprises: an output gear provided to said output shaft and rotatably housed in a gear case; a rotating body rotatably housed in said gear case and rotate-driven by said electric motor; a motive power conversion member having an arm part rotatably connected to said rotating body and a sector gear part meshing with said output gear in a linking shaft located away from a rotation-central axis of said rotating body; a swinging plate swingably connected to a gear shaft of said sector gear part and said output shaft, and swingably supporting said sector gear part around said output shaft; a slidable contact member mounted on a tip of said gear shaft so as to interpose said sector gear part and face said swinging plate, and slidably contacting with said gear case; and a provisional holding part provided in said slidable contact member and provisionally holding said motive power conversion member and said swinging plate.

The wiper motor according the present invention is such that said provisional holding part is provided with a leg part extending from said slidable contact member in a tooth-thickness direction of said sector gear part and a claw part protruding from said leg part and engaged with said swinging plate, and said sector gear part and said swinging plate are sandwiched between said claw part and said slidable contact member to provisionally hold said motive power conversion member and said swinging plate.

The wiper motor according to the present invention is such that a through hole is formed in a base end of said leg part.

The wiper motor according to the present invention is such that an arc surface regarding said gear shaft as an axial center is formed in said swinging plate, and said leg part is formed into such a cylindrical-piece shape as to be slidable in a swinging direction along said arc surface.

The wiper motor according to the present invention is such that an extending part extending to at least a portion in which said sector gear part and said output gear mesh with each other on each swinging-axial line of said sector gear part and said output gear is provided in said slidable contact member.

The wiper motor according to the present invention is such that said extending part is formed into such a sector form as to cover said sector gear.

According to the present invention, the motive power conversion member and the swinging plate can be provisionally held by the provisional holding part provided in the slidable contact member, so that those members can be assembled as one member in the gear case and the assembling operation of the wiper motor can be facilitated.

In addition, according to the present invention, since the provisional holding part is formed by the leg part extending from the slidable contact member and the claw part protruding from the leg part, the provisional holding part can be easily formed.

Moreover, according to the present invention, since the through hole is formed in the base end of the leg part, the leg part is easily elastically deformed. Therefore, the assembling performance of the slidable contact member having the provisional holding part can be improved.

Moreover, according to the present invention, the leg part formed into a cylindrical-piece shape slides in the swinging direction on the arc surface of the swinging plate, so that even if the swinging plate swings with respect to the sector gear part after being provisionally held, the engagement of the claw part can be maintained. Thus, the provisionally held state is maintained even if the swinging plate swings with respect to the provisionally held sector gear part, so that the assembling performance of the wiper motor can be further improved.

Moreover, according to the present invention, the extending part extending to the meshing portions of the sector gear part and the output gear is provided in the slidable contact member, so that, in addition to the motive power conversion member and the swinging plate, the output gear can also be provisionally held. Thus, since the motive power conversion member, the swinging plate, and the output gear can be assembled as one assembled member in the gear case, the assembling of the wiper motor can be further facilitated. In addition, the extending part is formed into a sector form, so that even if the swinging plate swings with respect to the sector gear part after being provisionally held, the provisionally holding of the meshing portions of the output gear and the sector gear part can be maintained. Therefore, the assembling performance of the wiper motor can be further enhanced.

DESCRIPTION OF THE PREFERRED EMBODIMENTS

Hereinafter, an embodiment of the present invention will be described in detail with reference to the drawings.

Figure 1:
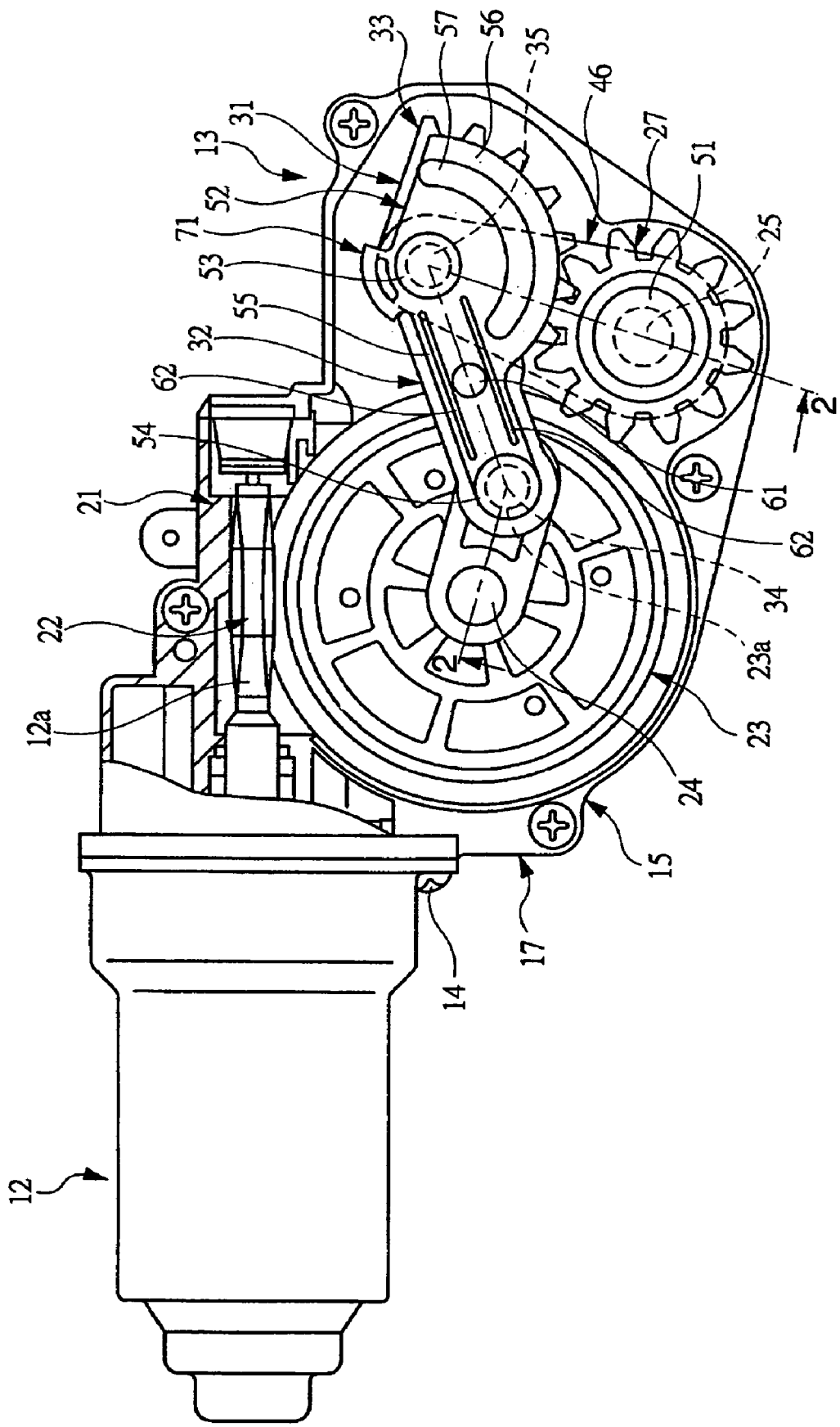
FIG. 1 is a cross-sectional view showing details of a wiper motor which is an embodiment of the present invention.
Figure 2:
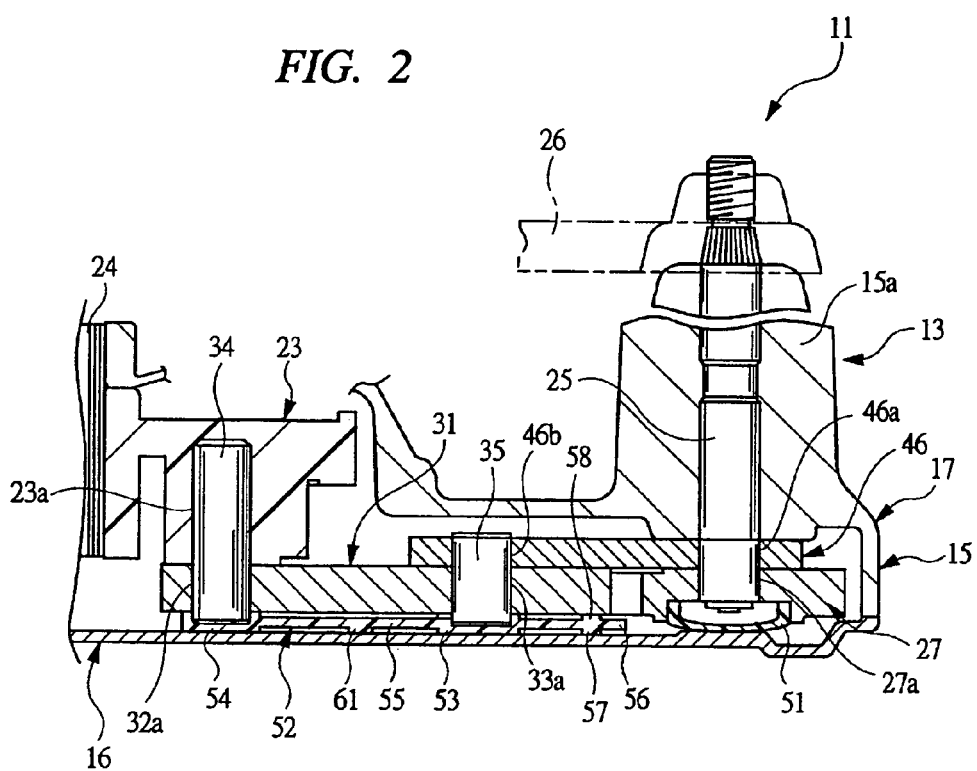
FIG. 2 is a cross-sectional view taken along line 2-2 in FIG. 1.

FIG. 1 is a cross-sectional view showing details of a wiper motor which is an embodiment of the present invention, and FIG. 2 is a cross-sectional view taken along line 2-2 in FIG. 1.

A wiper motor 11 shown in FIG. 1 is employed in a rear wiper device provided in an unshown vehicle, and has an electric motor 12 and a gear unit 13.

The electric motor 12 is a so-called DC motor with a brush, which has a rotating shaft 12a. When an unshown wiper switch is operated, a direct current is supplied from a power source such as a battery installed in the vehicle, whereby the rotating shaft 12a is rotated in a predetermined direction.

Although being illustrated as a DC motor with a brush in the drawings, the electric motor 12 is not limited to it and an electric motor of another type such as a brushless motor may be employed.

Meanwhile, the gear unit 13 has a gear case 17 comprising a bathtub-like case body 15 fixed to the electric motor 12 by a fastening member 14 and a cover 16 for closing the case body 15, wherein a worm gear mechanism 21 is housed in the case body 15.

The worm gear mechanism 21 has a worm 22 and a worm wheel 23 meshed with the worm 22, whereby the worm 22 is integrally formed on an outer circumference of the rotating shaft 12a protruding to an interior of the case body 15 and rotates together with the rotating shaft 12a. Meanwhile, the worm wheel 23 serving as a rotating body is supported by a support shaft 24 serving as a rotation-central axis provided to the case body 15 and is rotatably housed in the case body 15, and rotation of the rotating shaft 12a is reduced to a predetermined revolution speed and then transmitted. More specifically, the worm wheel 23 is driven by the electric motor 12 and rotates in a predetermined direction.

As shown in FIG. 2, a boss part 15a protruding in a direction parallel to the support shaft 24 is formed in the case body 15, and an output shaft 25 disposed to be parallel with the support shaft 24 is rotatably supported by the boss part 15a. One end of the output shaft 25 protrudes from the boss part 15a to the outside, and a rear wiper arm 26 (shown by the dashed line in FIG. 2) constituting the rear wiper device is attached to the tip thereof. The other end of the output shaft 25 is located in the case body 15, and an output gear 27 is provided at its tip. In this case, the output gear 27 is a spur wheel formed by sintering, and is integrally rotatable along with the output shaft 25 since the output shaft 25 is press-fitted in and fixed to one side of a through hole 27a provided at its axial center. Namely, the output gear 27 is rotatably housed in the case body 15 together with the output shaft 25.

The worm wheel 23 and the output gear 27 are connected to each other by a motive power conversion member 31, and the rotary motion of the worm wheel 23 is converted into the swinging motion by the motive power conversion member 31 and transmitted to the output shaft 25. More specifically, the rotary motion of the rotating shaft 12a, which is motive power of the electric motor 12, is reduced by the worm gear mechanism 21, converted into the swinging motion by the motive power conversion member 31, and outputted from the output shaft 25. Accordingly, the rear wiper arm 26 attached to the output shaft 25 is swung and driven by the wiper motor 11, whereby wiping motion of the rear wiper device is performed.

Figure 3:
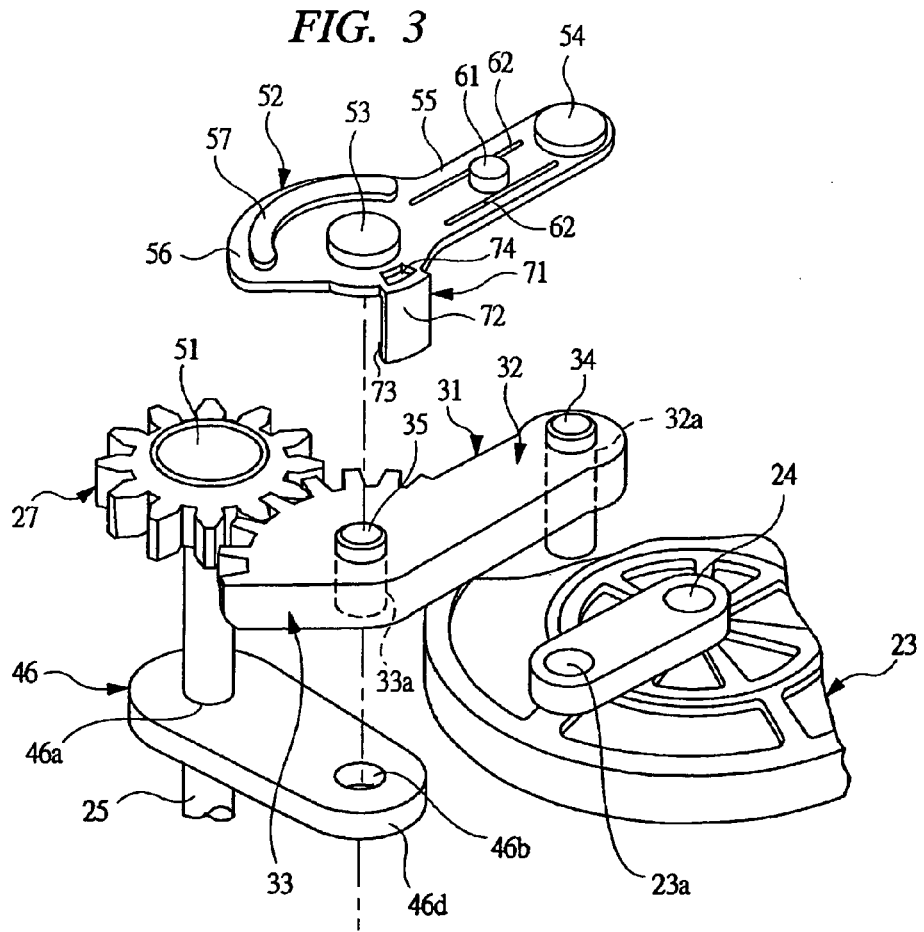
FIG. 3 is an exploded perspective view of a motive power conversion member shown in FIG. 1.

FIG. 3 is an exploded perspective view of the motive power conversion member shown in FIG. 1. A steel plate that is a plate material is blanked and processed into a predetermined shape by using a press machine, whereby the motive power conversion member 31 is formed into a plate-like shape having an arm part 32 and a sector gear part 33 provided at one end of the arm part 32 in a longitudinal direction.

A through hole 32a is formed on a tip side of the arm part 32, which is an opposite side to the sector gear part 33, and a linking shaft 34 parallel to the support shaft 24 is press-fitted in and fixed to the through hole 32a. Meanwhile, a through hole 33a is formed at an axial center of the sector gear part 33, i.e., a center of a pitch circle, and a gear shaft 35 parallel to the linking shaft 34 is press-fitted in and fixed to the through hole 33a.

Figure 4:
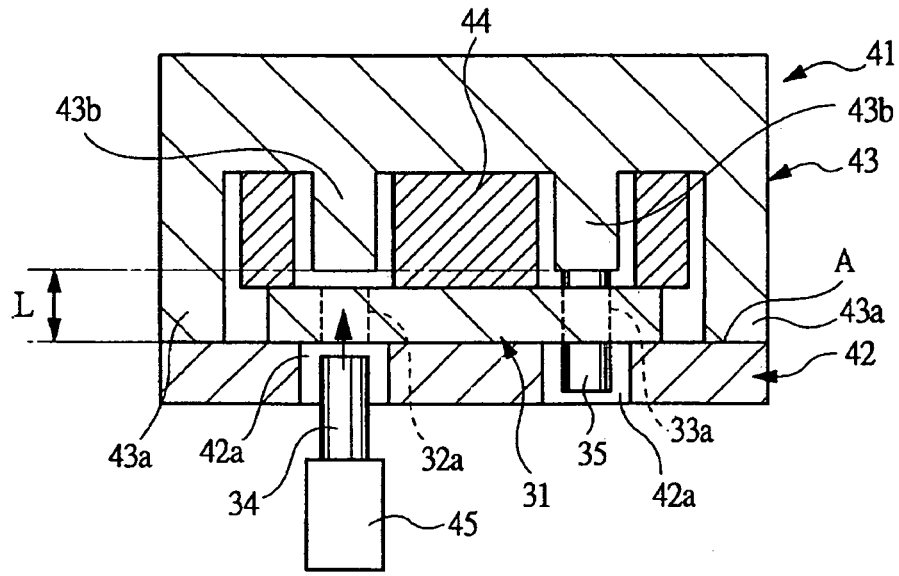
FIG. 4 is an explanatory drawing schematically showing a press-fitting machine for press-fitting a gear shaft and a linking shaft into the motive power conversion member.

FIG. 4 is an explanatory drawing schematically showing a press-fitting machine for press-fitting the gear shaft and the linking shaft into the motive power conversion member, and the shafts 34 and 35 are press-fitted into the respective through holes 32a and 33a of the motive power conversion member 31 by the press-fitting machine 41 shown in FIG. 4. The press-fitting machine 41 comprises: a reference plate 42 having a reference plane "A" on which the motive power conversion member 31 is disposed; a pin receiving jig 43 having a pair of abutting parts 43a which abut the reference plane "A" of the reference plate 42, and a pair of pin receiving parts 43b which are a predetermined distance "L" away from and face the reference plane "A"; a load receiving jig 44 which is disposed between the pin receiving jig 43 and the motive power conversion member 31 and supports a load applied to the motive power conversion member 31; and a press-fitting jig 45 for press-fitting the gear shaft 35 or linking shaft 34 into the through hole 32a or 33a of the motive power conversion member 31. The shafts 34 and 35 are press-fitted into the through holes 32a and 33a by the press-fitting jig 45 until they abut the pin receiving parts 43b via insertion holes 42a formed in the reference plate 42, so that a distance L between a surface of the motive power conversion member 31 located on a side of the reference plane "A" and each tip of the shafts 34 and 35 can be set to a predetermined value, regardless of variation in thickness of the motive power conversion member 31 and length of the respective shafts 34 and 35. Effects obtained by setting the distance L to the predetermined value will be described later.

A connecting hole 23a is formed in the worm wheel 23 so as to be away from a rotation-central axis, i.e., the support shaft 24, and the linking shaft 34 is rotatably engaged with the connecting hole 23a. Therefore, the arm part 32 is rotatably connected to the worm wheel 23 by the linking shaft 34 located away from the support shaft 24. Meanwhile, the sector gear part 33 is meshed with the output gear 27, and the gear shaft 35 and the output shaft 25 are connected by a swinging plate 46 in order to maintain the mesh of them.

Note that a protruding portion is integrally formed between the support shaft 24 and the connecting hole 23a on the worm wheel 23 and the thickness of the swinging plate 46 is set within a range of height of the protruding portion.

Figure 5:
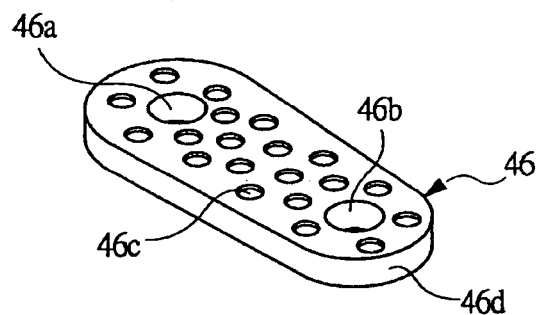
FIG. 5 is a perspective view showing details of a swinging plate shown in FIG. 3.
Figure 6:
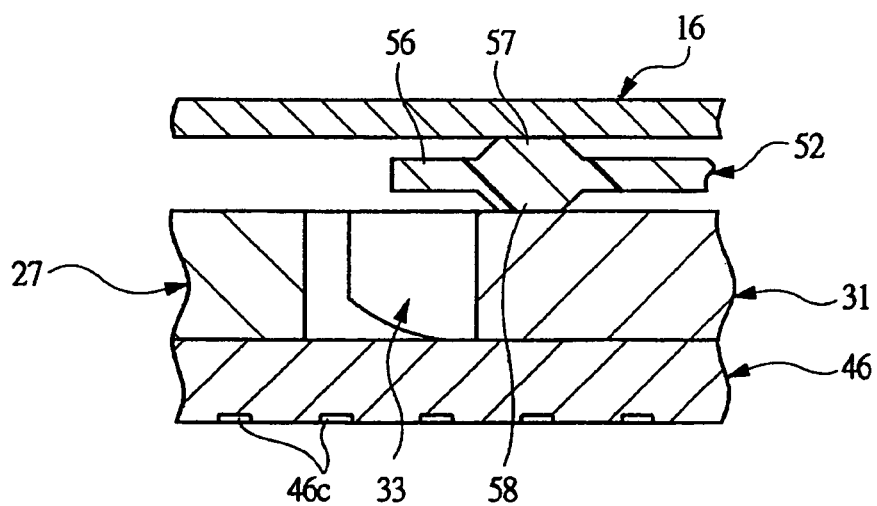
FIG. 6 is a cross-sectional view showing details of meshing portions of a sector gear part and an output gear shown in FIG. 3.

FIG. 5 is a perspective view showing details of the swinging plate shown in FIG. 3, and FIG. 6 is a cross-sectional view showing details of a meshing portion of the sector gear part and the output gear shown in FIG. 3.

As shown in FIG. 5, a plate material wound into a roll, i.e., a steel plate is wound off and then blanked and processed by a press machine, whereby the swinging plate 46 is formed into a plate-like shape with a pair of through holes 46a and 46b. In this case, a die formed into a convex shape is used in blanking and processing the swinging plate, thereby forming a plurality of dimples 46c (concave portions) shown in FIG. 5 on one surface of the swinging plate 46 (a surface opposite to a direction of being blanked by a blanking processing). By doing so, a rolling tendency of the steel plate which has been wounded off from a rolled state can be corrected, so that the swinging plate 46 with high flatness can be formed.

As shown in FIG. 3, the swinging plate 46 is disposed on a side of the case body 15 with respect to the output gear 27 and the sector gear part 33, the output shaft 25 is inserted in the through hole 46a, and the gear shaft 35 is inserted in the through hole 46b. Accordingly, the swinging plate 46 is swingably connected to the output shaft 25 and the gear shaft 35, and the sector gear part 33 is supported by the swinging plate 46 so as to be swingable around the output shaft 25. More specifically, the sector gear part 33 is supported by the swinging plate 46 so as to be swingable around the output shaft 25 in a state in which the mesh with the output gear 27 is maintained.

Also, as shown in FIG. 6, the swinging plate 46 is assembled such that a surface on which the dimples 46c are formed is directed to a side of the case body 15, i.e., an opposite side to the motive power conversion member 31 and the output gear 27, so that there is prevented occurrences of abnormal noise and damage generated when burrs etc. generated during the blanking processing contact with the motive power conversion member 31 or the output gear 27. At this time, since the dimples 46c serve as marks and a direction of assembling the swinging plate 46 is easily recognized, assembling performance of the wiper motor 11 can be improved.

In contrast, the motive power conversion member 31 is assembled so that a surface located in a direction of being blanked by the blanking processing is directed to a side of the swinging plate 46. That is, as shown in FIG. 6, on a surface side of the direction of being blanked by the blanking processing, tip portions of respective teeth of the sector gear part 33 are formed into curved shapes due to shrinkage cavities caused by the blanking processing. Therefore, since the surface located in the direction of being blanked is assembled toward the swinging plate 46, the burrs etc. generated by the processing can be prevented from contacting with the swinging plate 46. Thus, the occurrences of the damage and abnormal noise caused when the burrs etc. contact with the swinging plate 46 can be prevented.

By such a structure, in the wiper motor 11, when the electric motor 12 operates and the worm wheel 23 rotates, the arm part 32 is reciprocated by the rotation and the sector gear part 33 has the swinging motion with respect to the output gear 27. Consequently, the rotary motion of the worm wheel 23 is converted into the reciprocation and outputted from the output shaft 25. Accordingly, the rear wiper arm 26 attached to the output shaft 25 is swung and driven by the wiper motor 11, whereby the wiping motion of the rear wiper device is performed.

Figure 7:
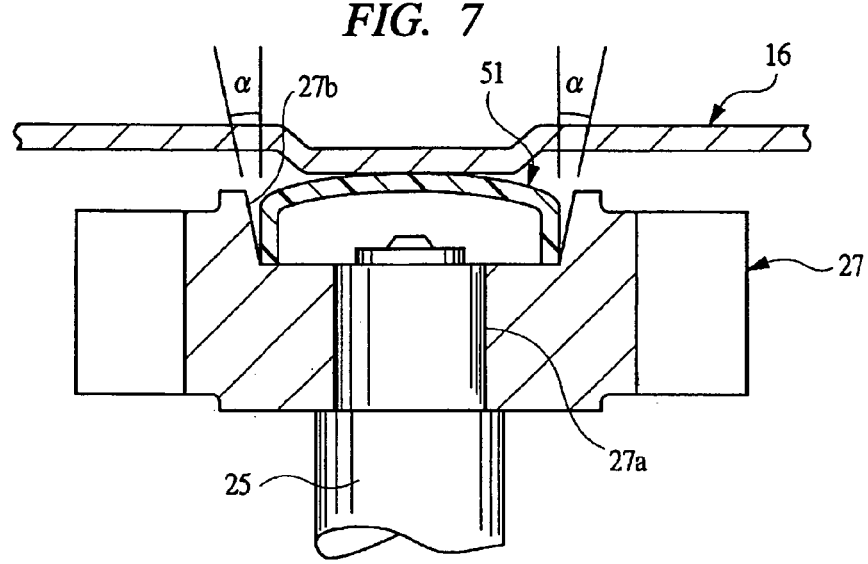
FIG. 7 is a cross-sectional view showing details of contacting portions of a first slidable contact member mounted on a tip of an output shaft and a cover.
Figure 8:
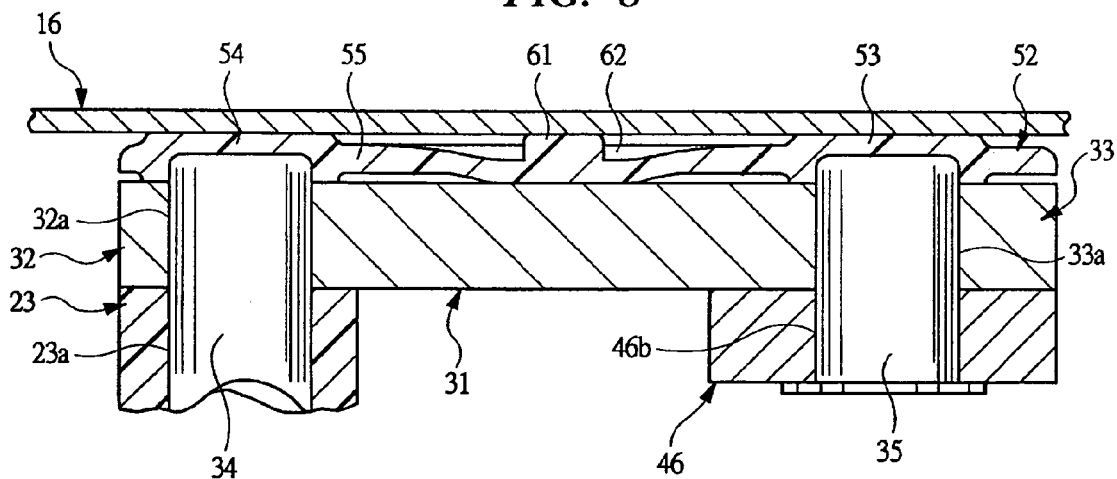
FIG. 8 is a cross-sectional view showing the details of contacting portions of a slidable contact plate attached to the motive power conversion member and the cover.

FIG. 7 is a cross-sectional view showing details of the contacting portion between a first slidable contact member attached to the tip of the output shaft and the cover, and FIG. 8 is a cross-sectional view showing details of the contacting portion between a slidable contact plate attached to the motive power conversion member and the cover.

A first slidable contact member 51 is mounted on the tip of the output shaft 25 disposed in the gear case 17 so as to face the swinging plate 46 by interposing the output gear 27. In this case, the first slidable contact member 51 is formed by a resin material into such a cap-like shape as to cover the tip of the output shaft 25 and is press-fitted into and fixed to the through hole 27a of the output gear 27 from the other side (a side opposite to the direction in which the output shaft 25 is press-fitted). The first slidable contact member 51 slidably contacts with the cover 16, whereby the directional-axial movement of the output shaft 25, i.e., the output gear 27 fixed thereto is restricted.

By doing so, looseness between the output shaft 25 and the interior of the gear case 17 of the output gear 27 is suppressed, whereby an occurrence of collision noise or the like generated between the cover 16 and the case body 15 can be suppressed.

As shown in FIG. 7, an inner surface 27b of a portion, which the first slidable contact member 51 of the through hole 27a formed in the output shaft 27 is press-fitted in and fixed to, is tapered so that its inner diameter becomes gradually small from an opening side thereof, that is, so as to be inclined by an angle α. Therefore, even when burrs are generated in the vicinity of an opening of the through hole 27a by forming the output gear 27 by sintering at a time of press-fitting and fixing the first slidable contact member 51 in and to the through hole 27a, the burrs are avoided and the first slidable contact member 51 can be reliably press-fitted in and fixed to the through hole 27a.

Thus, in the wiper motor 11, an attachment area of the first slidable contact member 51 with respect to the output gear 27 becomes small by forming the first slidable contact member 51 into such a cap-like shape as to cover the tip of the output shaft 25. Therefore, the thickness of the first slidable contact member 51 can be reduced, whereby the wiper motor 11 can be downsized.

In addition, in the wiper motor 11, the inner surface 27b of the through hole 27a, which the first slidable contact member 51 is press-fitted in and fixed to, is tapered so that its inner diameter becomes gradually small from the opening side. Therefore, the burrs generated in the opening are avoided, whereby the first slidable contact member 51 can be reliably press-fitting in and fixing to the through hole 27a.

Meanwhile, the slidable contact plate 52 made of a resin material is mounted on a surface located on a side of the motive power conversion member 31 facing the cover 16. As shown in FIG. 3, the slidable contact plate 52 comprises a second slidable contact part 53 serving as a second slidable contact member and a third slidable contact part 54 serving as a third slidable contact member, thereby having a structure in which the slidable contact parts 53 and 54 are integrally formed via a plate member 55 mounted on the motive power conversion member 31. That is, in this case, the second slidable contact part 53 and the third slidable contact part 54 are formed to be separated from the first slidable contact member 51.

As shown in FIG. 8, the second slidable contact part 53 is formed into such a cap-like shape as to protrude in an axial-directional direction with respect to the plate member 55, and is mounted on the tip of the gear shaft 35 so as to cover a tip portion of the gear shaft 35 protruding from the surface of the motive power conversion member 31. Also, the second slidable contact part 53 slidably contacts with the gear case 17, i.e., the cover 16 on the same side as that of the first slidable contact member 51, whereby the axial-directional movement of the sector gear part 33 fixed to the gear shaft 35 is restricted.

Similarly, the third slidable contact part 54 is formed into such a cap-like shape as to protrude in the axial direction with respect to the plate member 55, and is mounted on the tip of the linking shaft 34 so as to cover a tip portion of the linking shaft 34 protruding from the surface of the motive power conversion member 31. Also, in the same manner as the second slidable contact part 53, the third slidable contact part 54 slidably contacts with the cover 16, whereby the axial-directional movement of the arm part 32 fixed to the linking shaft 34 is restricted.

At this time, by press-fitting the respective shafts 34 and 35 into the motive power conversion member 31 by the press-fitting machine 41, the distance L from the surface contacting with the swinging plate 46 of the motive power conversion member 31 to the tips of the respective shafts 34 and 35 facing the cover 16 is precisely set, and the swinging plate 46 is supported by the case body 15 at a base end of the boss part 15a. Thus, gaps between the tips of the respective shafts 34 and 35 and the cover 16 can be also precisely set to predetermined values. Therefore, the second and third slidable contact parts 53 and 54 disposed between the tips of the respective shafts 34 and 35 and the cover can be slidably brought into contact with the cover 16 with a suitable contact pressure.

As shown in FIG. 3, an extending part 56 formed into a sector form is provided integrally with the second slidable contact part 53 in the slidable contact plate 52, and a surface located on a side opposite to the cover 16 of the sector gear part 33 is covered with the extending part 56. An outer circumference of the extending part 56 extends to meshing portions of the sector gear part 33 and the output gear 27, and arc-like ribs 57 respectively protruding in the axial direction of the output shaft 25 etc. are formed on both surfaces located on an outer circumferential side thereof. In addition, strength of the extending part 56 is enhanced due to these ribs 57, and the extending part 56 is reliably brought into contact with the motive power conversion member 31 and the cover 16.

A slidable-contact convex part 61, which is disposed between the second slidable contact part 53 and the third slidable contact part 54 and is larger in height protruding toward the cover 16 than the slidable contact parts 53 and 54, is provided on the plate member 55. In addition, a pair of slits 62, between which the slidable-contact convex part 61 is sandwiched, are formed in the plate member 55 and, as shown in FIG. 8, the slidable-contact convex part 61 contacts with the cover 16 in a state in which a portion of the plate member 55 sandwiched between the slits 62 is elastically deformed. That is, a slight gap is provided between the surfaces of the plate member 55 and the motive power conversion member 31, and the slidable-contact convex part 61 contacts with the cover 16 in a state in which the plate member 55 is bent in a direction of narrowing the gap. Therefore, even when the gaps occur between the second and third slidable contact parts 53 and 54 and the cover 16 due to dimensional errors or the like, the slidable-contact convex part 61 elastically contacts with the cover 16, thereby reliably causing the slidable contact plate 52 to be pressed against the motive power conversion member 31. Therefore, looseness of the respective slidable contact parts 53 and 54 can be prevented.

In the above described manner, in the wiper motor 11, since the axial-directional movement of the output gear 27 and the motive power conversion member 31 can be restricted by providing the first slidable contact member 51 and the slidable contact plate 52, those members 27 and 31 can be smoothly operated without looseness in the gear case 17. Also, a load in the direction of releasing the mesh is generated between the output gear 27 and the sector gear part 33 at a time of operating the electric motor 12 etc. However, since the load is supported by the cover 16 via the first slidable contact member 51 and/or the second slidable contact part 53, the gear shaft 35 is prevented from inclining with respect to the output shaft 25, so that the mesh of the output gear 27 and the sector gear part 33 can be maintained.

More specifically, when the load in the direction of releasing the mesh is generated between the output gear 27 and the sector gear part 33, the output shaft 25 supported by the boss part 15a and also supported via the first slidable contact member 51 by the cover 16 is prevented from inclining. On the other hand, a load is applied to the gear shaft 35 in a direction of inclining the swinging plate 46 regarded as a supporting point with respect to the output shaft 25 not inclined. At this time, since the load directed in the axial direction and applied to the gear shaft 35 is supported by the second slidable contact part 53 which slidably contacts with the cover 16, the gear shaft 35 is prevented from inclining, whereby the mesh between the output gear 27 and the sector gear part 33 is maintained.

Thus, in the wiper motor 11, the load in the direction of releasing the mesh occurring between the output gear 27 and the sector gear part 33 at a time of operating the electric motor 12 etc. is supported since the first slidable contact member 51 and the second slidable contact part 53 slidably contact with the cover 16. Therefore, the gear shaft 35 is prevented from inclining due to the load, whereby the mesh of the output gear 27 and the sector gear part 33 can be maintained.

In addition, in the wiper motor 11, the first slidable contact member 51 mounted on the tip of the output shaft 25 and the second slidable contact part 53 mounted on the tip of the gear shaft 35 are formed to be separated from each other, so that even when the load in the direction of releasing the mesh is generated between the output gear 27 and the sector gear part 33, the deformation of the first slidable contact member 51 or the second slidable contact part 53 due to the load is suppressed. Therefore, the thickness of the first slidable contact member 51 and the second slidable contact part 53 can be reduced in comparison with the case in which the first slidable contact member 51 and the second slidable contact part 53 are integrally formed. Accordingly, the wiper motor 11 can be downsized. In addition, since the deformation of the first slidable contact member 51 and the second slidable contact part 53 can be suppressed due to the load generated between the output gear 27 and the sector gear part 33, the durability of the wiper motor 11 can be improved.

Moreover, in the wiper motor 11, an extending part 56 is provided to the slidable contact plate 52 and the extending part 56 slidably contacts with the cover 16 in the outer circumferential portion of the sector gear part 33 (a portion in which teeth are formed), so that tilt and movement toward of the cover 16, in the case of regarding an engagement portion of the gear shaft 35 of the sector gear part 33 and the swinging plate 46 as a supporting point, can be reliably prevented. Therefore, even when the load in the direction of releasing the mesh occurring between the output gear 27 and the sector gear part 33 is generated, the mesh of the output gear 27 and the sector gear part 33 can be reliably maintained, whereby the operational efficiency of the wiper motor 11 can be improved. In addition, the extending part 56 extends to a meshing portion of the sector gear part 33 and is formed into such a sector form as to cover the meshing portion, so that even when meshing positions of the sector gear part 33 and the output gear 27 change in a thickness direction (due to tilt and movement of the gear shaft 35 of the sector gear part 33), the load applied to the sector gear part 33 can be always supported by the cover 16.

Moreover, in the wiper motor 11, the ribs 57 which contact with the surface of the cover 16 or sector gear part 33 are formed respectively on both sides of the extending part 56, so that strength and rigidity of the extending part 56 can be enhanced by the ribs 57 and the extending part 56 can be reliably brought into contact with the cover 16. Therefore, an effect of suppressing the tilt and movement of the gear shaft 35 by the extending part 56 can be enhanced, whereby the mesh of the output gear 27 and the sector gear part 33 can be reliably maintained.

Figure 9:
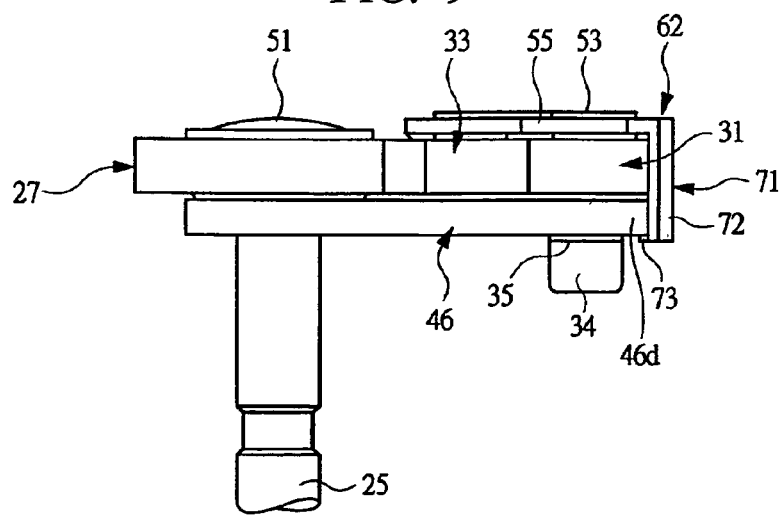
FIG. 9 is a front view showing a state in which the output gear, the swinging plate, and the motive power conversion member are provisionally held by a provisional holding part.

FIG. 9 is a front view showing a state in which the output gear, the swinging plate, and the motive power conversion member are provisionally held by a provisional holding part. In the wiper motor 11, in order to facilitate an operation of assembling respective members to the interior of the gear case 17, a provisional holding part 71 is integrally provided to the slidable contact plate 52 serving as a slidable contact member.

As shown in FIG. 3, the provisional holding part 71 comprises: a leg part 72 extending from the second slidable contact part 53 to a position going beyond the swinging plate 46 in a tooth-thickness direction of the sector gear part 33, i.e., in the axial direction; and a claw part 73 protruding in a radial direction from a tip of the leg part 72 and engaged with the swinging plate 46, wherein, as shown in FIG. 9, the sector gear part 33 and the swinging plate 46 are sandwiched between the second slidable contact part 53 and the claw part 73, thereby provisionally holding the motive power conversion member 31 and the swinging plate 46.

In this case, an arc surface 46d regarding the gear shaft 35 as an axial center is formed on a side surface of the swinging plate 46. The leg part 72 is formed into a cylindrical-piece shape whose section is an arc shape corresponding to the arc surface 46d, and is slidable in a swinging direction along the arc surface 46d. Accordingly, even if the swinging plate 46 swings about the gear shaft 35 regarded as a center with respect to the sector gear part 33 in a provisionally held state, the engagement of the claw part 73 with respect to the swinging plate 46 is not released and the provisional held state is maintained.

In addition, as shown in FIG. 3, a through hole 74 is formed in a base end of the leg part 72, and the leg part 72 can be easily elastically deformed by this through hole 74 in a direction in which the leg part 72 gets away from the arc surface 46d. Therefore, when the slidable contact plate 52 is mounted on the motive power conversion member 31 and the claw part 73 of the provisional holding part 71 is engaged with the swinging plate 46, the leg part 72 is easily elastically deformed, thereby facilitating attachment of the slidable contact plate 52 to the motive power conversion member 31.

Furthermore, as described above, the sector-shaped extending part 56 extending to the meshing portions of the sector gear part 33 and the output gear 27 is provided in the slidable contact plate 52 and the output gear 27 is sandwiched between the extending part 56 and the swinging plate 46, so that the output gear 27 is also provisionally held together with the motive power conversion member 31 and the swinging plate 46. Thus, the swinging plate 46, the motive power conversion member 31, the output gear 27, and the output shaft 25 fixed to the output gear 27 can be assembled as one provisionally held unit in the gear case 17, whereby the assembling operation of the wiper motor 11 can be facilitated.

As described above, in the wiper motor 11, the provisional holding part 71 is provided in the slidable contact plate 52 serving as a slidable contact member and the motive power conversion member 31 and the swinging plate 46 are provisionally held by the provisional holding part 71, so that these members can be assembled as one unit in the gear case 17, whereby the assembling operation of the wiper motor 11 can be facilitated.

In addition, in the wiper motor 11, the extending part 56 extending to the meshing portion of the sector gear part 33 is provided in the slidable contact part 52 and the output gear 27 is sandwiched between the extending part 56 and the swinging plate 46, so that, in addition to the swinging plate 46 and the motive power conversion member 31, the output gear 27 can be also provisionally held. Therefore, the assembling operation of the wiper motor 11 can be further facilitated. Note that although the extending part 56 is provided at least at portions in which the output gear 27 and the sector gear part 33 meshes with each other on respective swinging-(rotating-) axial lines of the output gear 27 and the sector gear part 33, the extending part is effective even when extending outside a gear part of the sector gear part 33 or when connecting the sector gear part 33 and the output shaft 27.

Moreover, in the wiper motor 11, the provisional holding part 71 is formed by the leg part 72 extending from the slidable contact plate 52 and by the claw part 73 protruding from the leg part 72, formation of the provisional holding part 71 can be facilitated.

Moreover, in the wiper motor 11, since the through hole 74 is formed in the base end of the leg part 72 to facilitate the elastic deformation of the leg part 72, the assembling performance of the slidable contact plate 52 having the provisional holding part 71 with respect to the motive power conversion member 31 can be improved.

Moreover, in the wiper motor 11, the leg part 72 is formed into a cylindrical-piece shape to be slidable on the arc surface 46d of the swinging plate 46 in the swinging direction, so that even if the swinging plate 46 swings with respect to the sector gear part 33 after being provisionally held, the engagement of the claw part 73 with respect to the swinging plate 46 can be maintained. Therefore, the assembling performance of the wiper motor 11 can be further enhanced.

Moreover, in the wiper motor 11, the extending part 56 is formed into a sector form, so that even if the swinging plate 46 swings with respect to the sector gear part 33 after being provisionally held, the assembling performance of the wiper motor 11 can be further improved since provisionally holding of the meshing portions of the output gear 27 and the sector gear part 33 can be maintained.

Needles to say, the present invention is not limited to the above-mentioned embodiment and may be variously altered and modified within a scope of not departing from the gist thereof. For example, in the above-described embodiment, the wiper motor 11 is used for driving the rear wiper arm 26 of the vehicle. However, the present invention is not limited thereto and may be used for driving a front wiper arm.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A wiper motor having an electric motor and an output shaft for outputting motive power generated by said electric motor, and swinging and driving a wiper arm attached to said output shaft, the wiper motor comprising:
   an output gear provided to said output shaft and rotatably housed in a gear case;
   a rotating body rotatably housed in said gear case and rotate-driven by said electric motor;
   a motive power conversion member having an arm part rotatably connected to said rotating body and a sector gear part meshing with said output gear in a linking shaft located away from a rotation-central axis of said rotating body;
   a swinging plate swingably connected to a gear shaft of said sector gear part and said output shaft, and swingably supporting said sector gear part around said output shaft;
   a slidable contact member mounted on a tip of said gear shaft so as to interpose said sector gear part and face said swinging plate, and slidably contacting with said gear case; and
   a provisional holding part provided in said slidable contact member and provisionally holding said motive power conversion member and said swinging plate;
   wherein said provisional holding part is provided with a leg part extending from said slidable contact member in a tooth-thickness direction of said sector gear part and a claw part protruding from said leg part and engaged with said swinging plate, and said sector gear part and said swinging plate are sandwiched between said claw part and said slidable contact member to provisionally hold said motive power conversion member and said swinging plate.

2. The wiper motor according to claim 1, wherein a through hole is formed in a base end of said leg part.

3. The wiper motor according to claim 2, wherein an arc surface regarding said gear shaft as an axial center is formed in said swinging plate, and said leg part is formed into such a cylindrical-piece shape as to be slidable in a swinging direction along said arc surface.

4. The wiper motor according to claim 2, wherein an extending part extending to at least a portion in which said sector gear part and said output gear mesh with each other on each swinging-axial line of said sector gear part and said output gear is provided in said slidable contact member.

5. The wiper motor according to claim 4, wherein said extending part is formed into such a sector form as to cover said sector gear.

6. The wiper motor according to claim 1, wherein an arc surface regarding said gear shaft as an axial center is formed in said swinging plate, and said leg part is formed into such a cylindrical-piece shape as to be slidable in a swinging direction along said arc surface.

7. The wiper motor according to claim 6, wherein an extending part extending to at least a portion in which said sector gear part and said output gear mesh with each other on each swinging-axial line of said sector gear part and said output gear is provided in said slidable contact member.

8. The wiper motor according to claim 7, wherein said extending part is formed into such a sector form as to cover said sector gear.

9. The wiper motor according to claim 1, wherein an extending part extending to at least a portion in which said sector gear part and said output gear mesh with each other on each swinging-axial line of said sector gear part and said output gear is provided in said slidable contact member.

10. The wiper motor according to claim 9, wherein said extending part is formed into such a sector form as to cover said sector gear.

11. The wiper motor according to claim 1, wherein an extending part extending to at least a portion in which said sector gear part and said output gear mesh with each other on each swinging-axial line of said sector gear part and said output gear is provided in said slidable contact member.

12. The wiper motor according to claim 11, wherein said extending part is formed into such a sector form as to cover said sector gear.

* * * * *